(12) United States Patent
Finnila et al.

(10) Patent No.: US 9,219,847 B2
(45) Date of Patent: Dec. 22, 2015

(54) TUNING OF DIGITAL IMAGE QUALITY

(75) Inventors: Tapio Finnila, Tampere (FI); Timo Gerasimow, Tampere (FI)

(73) Assignee: Nokia Technologies Oy, Espoo (FI)

( * ) Notice: Subject to any disclaimer, the term of this patent is extended or adjusted under 35 U.S.C. 154(b) by 254 days.

(21) Appl. No.: 13/882,418

(22) PCT Filed: Nov. 1, 2010

(86) PCT No.: PCT/FI2010/050869
§ 371 (c)(1),
(2), (4) Date: Aug. 13, 2013

(87) PCT Pub. No.: WO2012/059618
PCT Pub. Date: May 10, 2012

(65) Prior Publication Data
US 2013/0308006 A1 Nov. 21, 2013

(51) Int. Cl.
H04N 5/232 (2006.01)
H04N 5/225 (2006.01)
H04N 5/357 (2011.01)

(52) U.S. Cl.
CPC .......... *H04N 5/225* (2013.01); *H04N 5/23225* (2013.01); *H04N 5/357* (2013.01)

(58) Field of Classification Search
CPC ... H04N 5/232; H04N 5/23219; H04N 5/235; H04N 9/735; H04N 9/79; H04N 5/23225; H04N 5/225; H04N 5/357
USPC ............ 348/222.1, 231.99, 231.3, 231.6, 239
See application file for complete search history.

(56) References Cited

U.S. PATENT DOCUMENTS

| | | | |
|---|---|---|---|
| 6,273,535 B1 | 8/2001 | Inoue | |
| 7,602,419 B2* | 10/2009 | Kiuchi | 348/211.1 |
| 7,835,569 B2* | 11/2010 | Marcu | 382/162 |
| 8,135,068 B1* | 3/2012 | Alvarez et al. | 375/240.16 |
| 8,411,338 B2* | 4/2013 | Onozawa | 358/518 |
| 2001/0020978 A1* | 9/2001 | Matsui et al. | 348/222 |
| 2002/0140825 A1 | 10/2002 | Terashita | |
| 2003/0063213 A1* | 4/2003 | Poplin | 348/362 |
| 2004/0150732 A1 | 8/2004 | Yamanaka | |
| 2006/0026304 A1* | 2/2006 | Price | 710/8 |
| 2006/0221199 A1* | 10/2006 | Nakajima | 348/222.1 |
| 2007/0024719 A1* | 2/2007 | Sakurai | 348/223.1 |

(Continued)

FOREIGN PATENT DOCUMENTS

EP 2227004 9/2010

OTHER PUBLICATIONS

Extended European Search Report of EP Application No. 10859199.1—Date of Completion of Search: Mar. 31, 2014, 6 pages.

(Continued)

*Primary Examiner* — Aung S Moe
(74) *Attorney, Agent, or Firm* — Locke Lord LLP (57) ABSTRACT

An image restoration method includes providing image data (260) including image statistics (230) using a digital camera module. A set of digital camera module characterization parameters is selected from a common dynamic camera configuration file (210) using the image statistics (230). The selected digital camera module characterization parameters are converted to image signal processing parameters and the image data is tuned using the image signal processing parameters for providing a tuned image (270). The method may involve lens shading correction as well adjusting the processing to the characteristics of the image sensor (250).

19 Claims, 3 Drawing Sheets

(56) References Cited

U.S. PATENT DOCUMENTS

| | | | |
|---|---|---|---|
| 2008/0007630 A1 | 1/2008 | Hara | |
| 2008/0013787 A1* | 1/2008 | Kobayashi | 382/103 |
| 2008/0198544 A1* | 8/2008 | Schenk | 361/684 |
| 2008/0292219 A1* | 11/2008 | Keall et al. | 382/313 |
| 2008/0303926 A1 | 12/2008 | Vehvilainen | |
| 2010/0226594 A1* | 9/2010 | Mikawa | 382/309 |
| 2010/0321528 A1* | 12/2010 | Yu et al. | 348/231.2 |
| 2011/0090370 A1* | 4/2011 | Cote et al. | 348/237 |
| 2011/0261061 A1* | 10/2011 | Lees et al. | 345/501 |
| 2011/0298933 A1* | 12/2011 | Yanowitz et al. | 348/175 |
| 2011/0298945 A1* | 12/2011 | Chen et al. | 348/223.1 |
| 2012/0081553 A1* | 4/2012 | Cote et al. | 348/207.1 |
| 2013/0321678 A1* | 12/2013 | Cote et al. | 348/251 |

OTHER PUBLICATIONS

International Search Report for International Application No. PCT/FI2010/050869—Date of Completion of Search: Jun. 22, 2011, 6 pages.

Written Opinion of the International Searching Authority for International Application No. PCT/FI2010/050869—Date of Completion of Opinion: Jun. 22, 2011, 8 pages.

* cited by examiner

TUNING OF DIGITAL IMAGE QUALITY

TECHNICAL FIELD

The present invention relates generally to digital camera modules or apparatuses comprising digital cameras and, more specifically, to tuning quality of images taken by the digital camera, and characterizing parameters of the camera module.

BACKGROUND ART

Camera modules have individual characteristics depending on their electrical, optical and mechanical design and manufacturing process. Characterization data may depend on camera sample, camera type or manufacturer. Most of the characteristics are non-idealities, which need to be compensated or corrected in an image signal processor (ISP) that processes raw data from camera module output.

SUMMARY

According to a first example aspect of the invention there is provided an apparatus comprising:
  a digital camera module configured to provide image data including image statistics;
  at least one processor and at least one memory including computer program code, the at least one memory and the computer program code configured to, with the at least one processor, cause the apparatus at least to:
    select a set of digital camera module characterization parameters from a common dynamic camera configuration file using the image statistics;
    convert the selected digital camera module characterization parameters to image signal processing parameters; and
    tune the image data using the image signal processing parameters to provide a tuned image.

The image data may be in raw image format and the image statistics may comprise at least one of the following: exposure time, analog gain, aperture, focal distance, white balance gain, correlated color temperature estimate and auto exposure. The digital camera module characterization parameters may comprise at least one of the following: black level, image sensor saturation limit, lens shading correction, noise filtering and sharpening.

The apparatus may further comprise an auto-tuning block configured to convert the selected digital camera module characterization parameters to image signal processing parameters.

The common dynamic camera configuration file may be updated independently from the at least one processor and the file may be divided into at least two parameter sets with unique identification and version number. The identification may be configured to link content of a parameter set to logical image signal processing.

The common dynamic camera configuration file may be stored in the at least one memory of the apparatus or in the digital camera module. The common dynamic camera configuration file may be configured to be usable by at least two different processor types.

The apparatus may further comprise:
  a second digital camera module configured to provide second image data including second image statistics; and
  the at least one memory and the computer program code configured to, with the at least one processor, cause the apparatus at least to:
    select a set of second digital camera module characterization parameters from a second common dynamic camera configuration file using the second image statistics;
    convert the selected set of second digital camera module characterization parameters to second image signal processing parameters; and
    tune the second image data using the second image signal processing parameters for providing a second tuned image.

According to a second example aspect of the invention there is provided a method comprising:
  providing image data including image statistics using a digital camera module;
  selecting a set of digital camera module characterization parameters from the common dynamic camera configuration file using the image statistics;
  converting the selected digital camera module characterization parameters to image signal processing parameters; and
  tuning the image data using the image signal processing parameters for providing a tuned image.

According to a third example aspect there is provided a computer program comprising computer executable program code configured to cause an apparatus to perform, on executing the program code, a method according to the second aspect.

According to a fourth example aspect there is provided a memory medium carrying the computer program of the third example aspect.

Any foregoing memory medium may comprise digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Camera modules may have individual characteristics depending on their electrical, optical and mechanical design and manufacturing process. Characterization data may be almost any information depending on camera sample, camera type or manufacturer. Typically, the characteristics are non-idealities, which may need to be compensated or corrected in an image signal processor (ISP). The image signal processor (ISP) may process raw image data from a camera module output. Camera module characteristics may be collected by measurements; for example by capturing and analyzing raw images with pre-defined settings.

Figure 1:
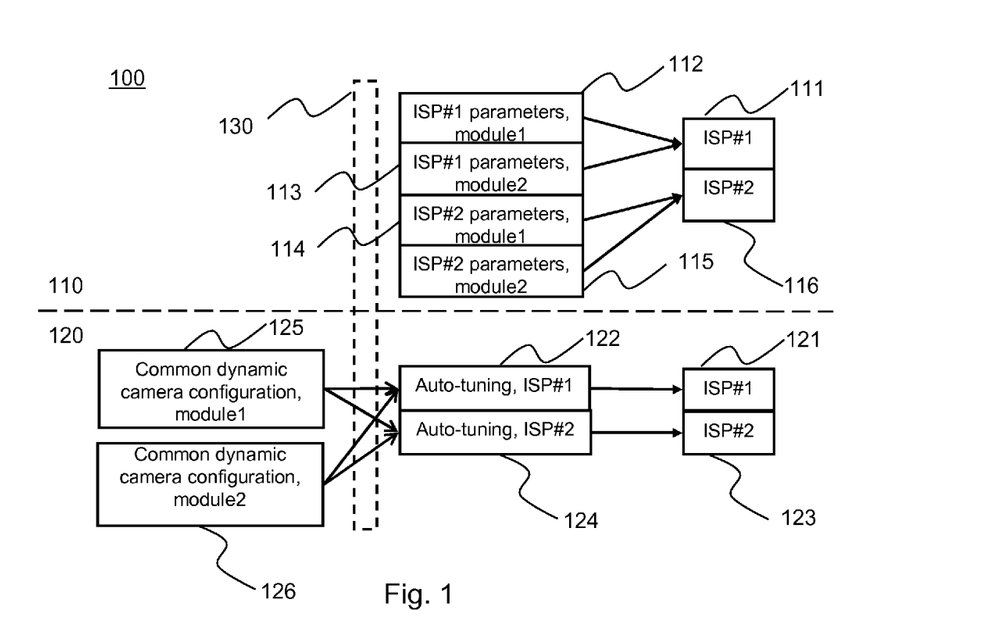
FIG. 1 shows some details of the common layer system in accordance with an example embodiment of the invention.

FIG. 1 shows some details of a common layer system 100 in accordance with an example embodiment of the invention compared to known solutions. Known camera systems 110 are designed to work with a combination of camera module characterization data and image signal processor (ISP) parameters 112 to 115, also known as image signal processor (ISP) specific tuning parameters. An image signal processor (ISP) 111,116 may use different algorithms in different phases to process raw image data. Each algorithm utilizes certain parts of the camera characterization data as parameters in order to achieve, partly subjectively and partly objectively, the best possible image quality (IQ). The image signal processor (ISP) parameters 112 to 115 may depend on the implementation and possible hardware and software limitations. However, overlapping parameters between different image signal processors (ISP) exist.

Each image signal processor (ISP) 111,116 may have own processing parameters 112 to 115 that need to be configured for a particular camera module. Adjusting of the image signal processor (ISP) parameters 112 to 115 for a camera sensor requires some good insight of the image signal processor (ISP) because many of the parameters 112 to 115 may be redundant and may need no adjusting. In addition, to be able to tune an image signal processor (ISP), the algorithm behavior of the particular image signal processor (ISP) should also be known, which is problematic because normally that information is complex and protected. Having knowledge of parameters of one image signal processor (ISP) might not help at all when working with other one.

Another issue is multiple camera modules and image signal processors (ISP). Having, for example, two cameras (main and secondary) in an apparatus and two suppliers for both cameras will result to four different cameras. In addition, three different image signal processors (ISP) will result to 12 different combinations, meaning 12 different image signal processor (ISP) parameter tunings and camera module characterizations. Adjusting the parameters would also require good insight of all of these image signal processors (ISP) and camera modules.

Lack of a common layer of camera module tuning parameters may increase the development time of the image signal processor (ISP) tuning process. In general, the problem has been the lack of abstract layer between general camera module characterization values and image signal processor (ISP) specific tuning parameters. In addition, changing of image signal processor (ISP) parameters has not resulted into similar change in the perceived image quality, for example sharpening or noise filtering, which has made image quality tuning tricky.

In known camera systems 110, the tuning parameters 112 to 115 are image signal processor (ISP) specific and created with image signal processor (ISP) specific tools. Because of this, all camera/image signal processor (ISP) combinations may need to be tuned separately. All the parameters 112 to 115 are constructed on personal computer (PC) side for a specific image signal processor (ISP). Such construction may expose the image signal processor (ISP) and the algorithms that may not be a favorable solution from the image signal processor (ISP) supplier point of view. Known solutions also require the image signal processor (ISP) and camera module combination to be available before the tuning could start and not allowing easy differentiation. The tuning and characterization work done on the right side of the abstraction layer 130 is mostly non-reusable between different platforms. As can be seen, the amount of work quickly escalates when the number of image signal processors (ISP) and camera modules increase. Image quality (IQ) tuning, verification and camera configuration releasing are done separately for each camera/image signal processor (ISP) combination. Even if the same camera module would be used in apparatuses with different image signal processors (ISP), the other apparatuses may not utilize the existing work of the existing image quality (IQ) tunings already released.

Bottom part 120 of FIG. 1 illustrates some details of the common layer system 100 in accordance to an example embodiment of the invention. Common dynamic camera configuration (CDCC) 125, 126 comprises a super set of abstract image quality (IQ) tuning and camera module characterization parameters. The format of common dynamic camera configuration (CDCC) 125, 126 is the same for different image signal processors (ISP) and camera modules. An image signal processor (ISP) 121, 123 may not need to use all the parameters but the common dynamic camera configuration (CDCC) 125, 126 may comprise as large set of parameters as may be needed for image quality (IQ) tuning values for different image signal processors (ISP) 121, 123. The common dynamic camera configuration (CDCC) 125, 126 is a generalization since image quality (IQ) tuning is done for the camera module instead of a specific image signal processor (ISP) 121, 123. Furthermore, every image signal processor (ISP) 121, 123 may utilize the image quality (IQ) tuning faster since releasing may be done for the camera module instead of the combination of the image signal processor (ISP) 121, 123 and the camera. Thus, the same camera module specific tuning file may be used in all the image signal processors (ISP) 121, 123 implementing the common dynamic camera configuration (CDCC) 125, 126.

In accordance with an example embodiment of the invention, auto-tuning block 122, 124 shown in FIG. 1 may convert the common tuning values in common dynamic camera configuration (CDCC) 125, 126 file into image signal processor (ISP) 121, 123 specific parameters in the device end. Such solution may allow plugging a camera module containing a module specific common dynamic camera configuration (CDCC) 125, 126 file into a device supporting common dynamic camera configuration (CDCC). Such a combination may result in a fully tuned and functional camera system without any software differentiation or image signal processor (ISP) 121, 123 specific tunings needed.

Figure 2:
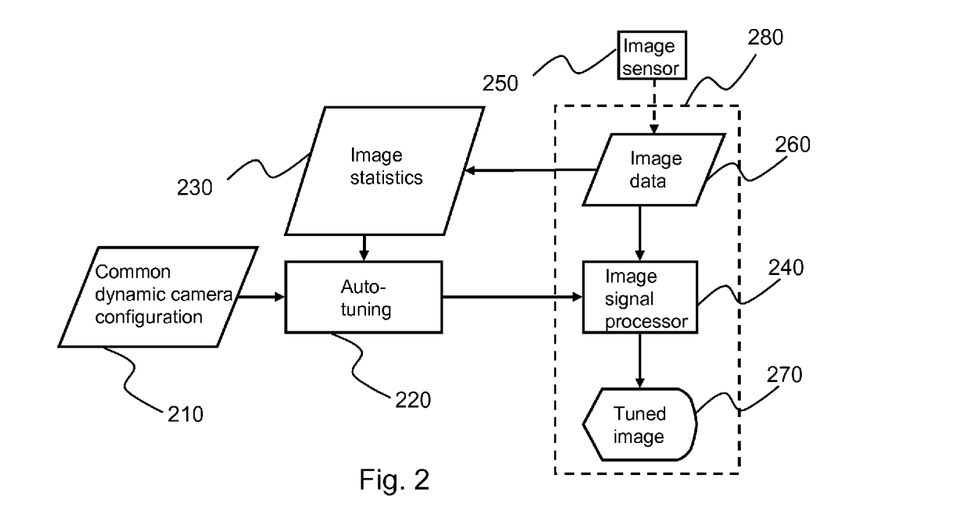
FIG. 2 shows a schematic drawing of different functionalities in an apparatus in accordance with an example embodiment of the invention.

FIG. 2 shows a schematic drawing of different functionalities in an apparatus in accordance with an example embodiment of the invention. Image data 260 may be provided by an image sensor 250. The image data 260 may be in raw image format. A raw image file may contain minimally processed data from the image sensor 250. Raw files are typically so named because they are not yet processed and therefore are not ready to be printed or edited with a bitmap graphics editor. Normally, the image is processed by a raw converter in a wide-gamut internal color space where precise adjustments can be made before conversion to a "positive" file format such as tagged image file format (TIFF) or joint photographic experts group (JPEG) for storage, printing, or further manipulation, which often encodes the image in a device-dependent color space. Simultaneously with the raw image data 260 creation, image statistics 230 are generated. Image statistics 230 for a raw image provided by the sensor 250 may comprise exposure time, analog gain (AG), aperture, focal distance, white balance gain, correlated color temperature estimate and auto exposure, for example.

A camera module may be supplied with a common dynamic camera configuration (CDCC) 210 file. The common dynamic camera configuration (CDCC) 210 file may be included in the camera module memory and provided to the memory of a host device when the camera module is connected to the host device. Such solution would be optimal from integration point of view. Another option would be to include the common dynamic camera configuration (CDCC) 210 file in the memory of the host device already on the production line when the camera module is installed to the device. Still another option would be to download the common dynamic camera configuration (CDCC) 210 file during software update of the host device or independently over-the-air. The common dynamic camera configuration (CDCC) 210 file may also be locally over short-range radio link (e.g. Bluetooth™) or cable connection (e.g. universal serial bus (USB)).

The common dynamic camera configuration (CDCC) 210 file may be passed to an auto-tuning block 220. The content of the common dynamic camera configuration (CDCC) 210 file may be first parsed and after that the auto-tuning block 220 may select the corresponding common dynamic camera configuration (CDCC) image quality (IQ) parameters using image statistics 230 and convert the common dynamic camera configuration (CDCC) values to image signal processor (ISP) 230 parameters containing the image signal processor (ISP) 240 specific tuning values for the current image 260 in the image processing pipe 280 of an example embodiment of the invention. The image signal processor (ISP) 240 may tune the current image 260 using the image signal processor (ISP) 240 specific tuning values created by the auto-tuning block 220 to generate a tuned image 270. The common dynamic camera configuration (CDCC) 210 file format may be binary, extensible markup language (xml) or anything else. Using of a dynamic file enables the independent update of the software itself.

From implementation verification point of view, common dynamic camera configuration (CDCC) parameters may be divided into two sets; parameters the mapping of which may be verified by automatic image analysis (for example black level, sensor saturation limit, lens shading correction etc.) and parameters the mapping of which may need visual verification to prior platform supporting common dynamic camera configuration (CDCC) (for example noise filtering and sharpening).

Figure 3:
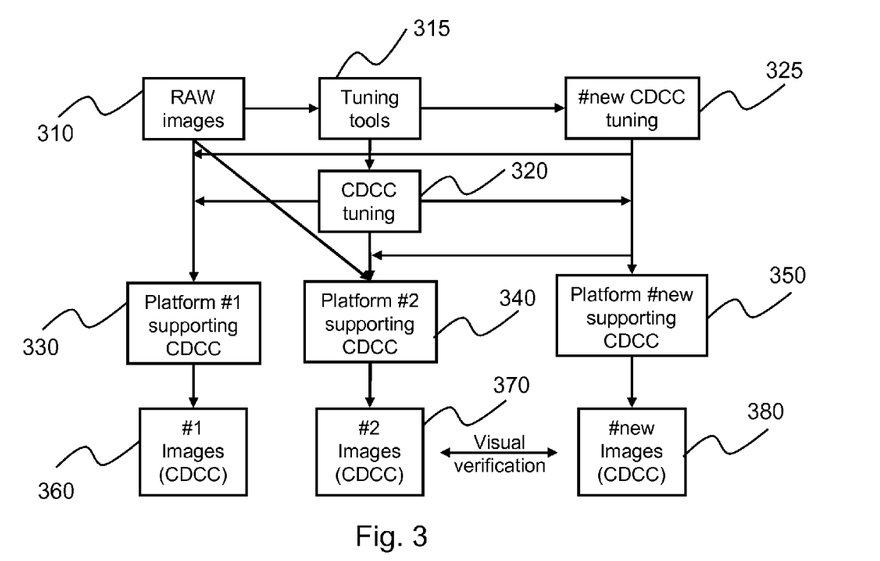
FIG. 3 shows a visual verification method for common dynamic camera configuration (CDCC) parameters in accordance with an example embodiment of the invention.

FIG. 3 shows a visual verification method for common dynamic camera configuration (CDCC) parameters in accordance with an example embodiment of the invention. Such method may be used also for generating a new common dynamic camera configuration (CDCC) file 325 for a new platform 350 with a new auto-tuning block and a parser. Same unprocessed raw images 310 may be simulated with a corresponding common dynamic camera configuration (CDCC) file 320 using raw image statistics provided by tuning tools 315 in different image signal processors (ISP) 330, 340 supporting the common dynamic camera configuration (CDCC). Tuned images 360, 370 generated by the image signal processors (ISP) 330, 340 supporting the common dynamic camera configuration (CDCC) may be compared to an image 380 of a new platform 350, where the implementation is under development. The new platform 350 may use a new version of common dynamic camera configuration (CDCC) file 325. The new version of common dynamic camera configuration (CDCC) file 325 may be generated using the earlier common dynamic camera configuration (CDCC) file 320 as a starting point. Parameters in the file may be added and modified to be optimal for the new platform 350 to result in the new version of common dynamic camera configuration (CDCC) file 325. Using vast number of different raw images 310 with different exposure parameters provided by the tuning tools 315 may result to even better match.

The common dynamic camera configuration (CDCC) file 320 structure may be divided into different parameter sets with a unique identification (ID) and version number. The identification (ID) links the content of the parameter set into the logical image signal processors (ISP) section. The parameter sets may comprise for example noise filter, black level correction and lens shading correction. New parameters may be added to the parameter sets but may not be taken away. In this way, backward compatibility may be provided and newer common dynamic camera configuration (CDCC) files 325 may be used in older platforms 330, 340. The new common dynamic camera configuration (CDCC) file 325 may be used for a new platform 350 and the resulting image 380 may be compared to the image 360, 370 of an earlier platform for visual verification to ensure the compatibility. Furthermore, also the earlier common dynamic camera configuration (CDCC) file 320 may be used in newer platform 350. Due to possible lack of certain parameters in the earlier common dynamic camera configuration (CDCC) file 320, the resulting image may not be the best possible. However, the earlier common dynamic camera configuration (CDCC) file 320 is compliant with the newer platform 350.

In an example embodiment of the invention, the common dynamic camera configuration (CDCC) reduces redundant image quality (IQ) tuning work. The common dynamic camera configuration (CDCC) may also enable image quality (IQ) tuning work to be started prior of having the hardware part of the image signal processor (ISP) available. Moreover, the common dynamic camera configuration (CDCC) may decrease the development time and enable handling of the common dynamic camera configuration (CDCC) releases and testing by one party. A common abstract image quality (IQ) tuning layer 130 may also enable third parties to utilize common dynamic camera configuration (CDCC) image quality (IQ) tunings without knowing details about image signal processor (ISP) configuration parameters.

In an example embodiment of the invention, changing of common dynamic camera configuration (CDCC) parameters may have corresponding effect to the image quality in all platforms supporting the common dynamic camera configuration (CDCC). Such effect is due to the auto-tuning block 122, 124, 220, which maps the abstract common dynamic camera configuration (CDCC) parameters to image signal processor (ISP) 121, 123, 240 parameters. Thus, the digital camera may be directly taken into use in any platform supporting common dynamic camera configuration (CDCC).

Furthermore, third party applications utilizing the common dynamic camera configuration (CDCC) interface are platform/camera module independent from image quality point of view. Same third party camera applications may be used in different platforms without image signal processor (ISP) 121, 123, 240 or camera module related software changes. The common dynamic camera configuration (CDCC) may also allow usage of different algorithms and does not degrade the image quality.

The camera vendors may support common dynamic camera configuration (CDCC) by characterizing their camera module according to the specification. Combination of image signal processor (ISP) 121, 123, 240 and supporting common dynamic camera configuration (CDCC) enhances modularity and allows short and straightforward integration of the camera module and the image signal processor (ISP) 121, 123, 240.

In an example embodiment of the invention, common parameters may be used for all image signal processors (ISP) 121, 123, 240 and only one tuning tool may be used to create the tuning file. A set of parameters from the tuning file may be converted to image signal processors (ISP) 121, 123, 240 specific format when transferred to the image signal processors (ISP) 121, 123, 240 typically located in the device to which a camera module is attached. The camera module may be tuned and taken directly into use in all image signal processors (ISP) 121, 123, 240 supporting common dynamic camera configuration (CDCC) when having camera module specific common dynamic camera configuration (CDCC) tuning file. Using of common parameters and converting the parameters to image signal processor (ISP) 121, 123, 240 specific in auto tuning block enables hiding of the image signal processor (ISP) 121, 123, 240 settings behind the common dynamic camera configuration (CDCC) interface. Using common dynamic camera configuration (CDCC) it is possible to tune for the future image signal processors (ISP) 121, 123, 240 before the image signal processor (ISP) 121, 123, 240 is even manufactured. When the new image signal processor (ISP) 121, 123, 240 supports common dynamic camera configuration (CDCC), the camera module may be taken directly into use without any image signal processor (ISP) 121, 123, 240 specific differentiations.

In an example embodiment of the invention, image signal processor (ISP) 121, 123, 240 supplier may deliver fully common dynamic camera configuration (CDCC) compliant image signal processors (ISP) 121, 123, 240 and hide the processor implementation behind a common interface. Camera module suppliers may have common dynamic camera configuration (CDCC) tuning tools and characterization image capturing guideline. Using the tools and guideline camera modules with full image quality tuning may be supplied for all image signal processors (ISP) 121, 123, 240 supporting common dynamic camera configuration (CDCC). As a result, development and manufacturing time may be decreased, integration risk reduced and higher modularity enabled.

Figure 4:
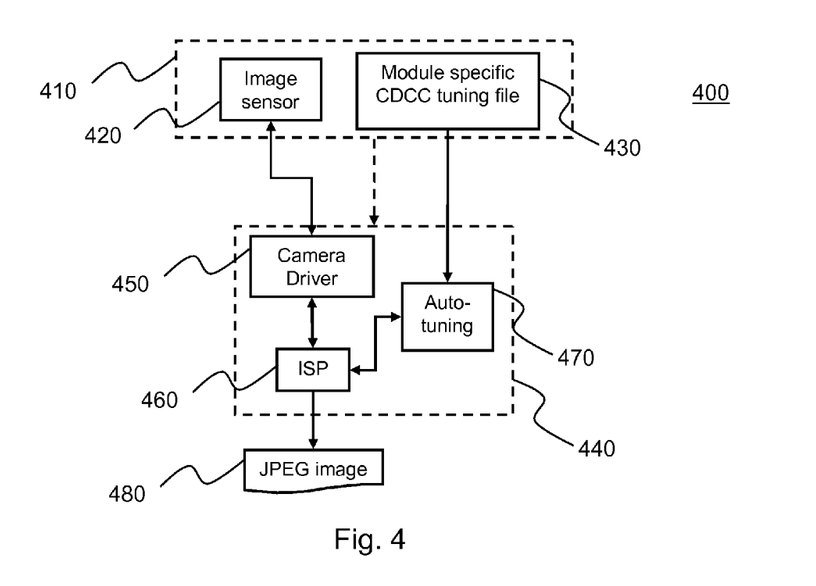
FIG. 4 shows an example block diagram of an image processing pipeline in which various embodiments of the invention may be applied.

FIG. 4 presents an example block diagram of an image processing pipeline 400 in which various embodiments of the invention may be applied. A common dynamic camera configuration (CDCC) file 430 may be delivered together with a digital camera module 410. The digital camera module may also comprise an image sensor 420, mechanics (not shown) and optics (not shown), for example. The common dynamic camera configuration (CDCC) file 430 is digital camera module 410 specific and may be stored to a memory of an electronic device 440, such as mobile phone, for example. The common dynamic camera configuration (CDCC) file 430 may also be delivered separately from the digital camera module 410 using a storage device or a possibility to download the file 430 from the network, for example. The digital camera module 410 including the image sensor 420 may be tuned utilizing the file 430 and become fully usable in a system (e.g. mobile phone) supporting common dynamic camera configuration (CDCC). Raw images from the digital camera module 410 may be transferred using the camera driver 450 to an image signal processor (ISP) 460. An auto-tuning block 470 may select the corresponding common dynamic camera configuration (CDCC) image quality (IQ) parameters using image statistics and convert the common dynamic camera configuration (CDCC) values to image signal processor (ISP) 460 parameters containing the image signal processor (ISP) 460 specific tuning values for the raw image provided by the digital camera module 410 of the image processing pipe 400 of an example embodiment of the invention. The image signal processor (ISP) 460 may tune the raw image using the image signal processor (ISP) 460 specific tuning values created by the auto-tuning block 470 to generate a tuned image 480, for example a joint photographic experts group (JPEG) image. The auto-tuning block 470 may also be located after the image signal processor (ISP) 460 in the image processing pipeline 400. According to an example embodiment of the invention, the image signal processor (ISP) 460 may process the raw image provided by the image sensor 420 and the processed image may be tuned by another processor of the device using the tuning values created by the auto-tuning block 470 to generate a tuned image 480.

Figure 5:
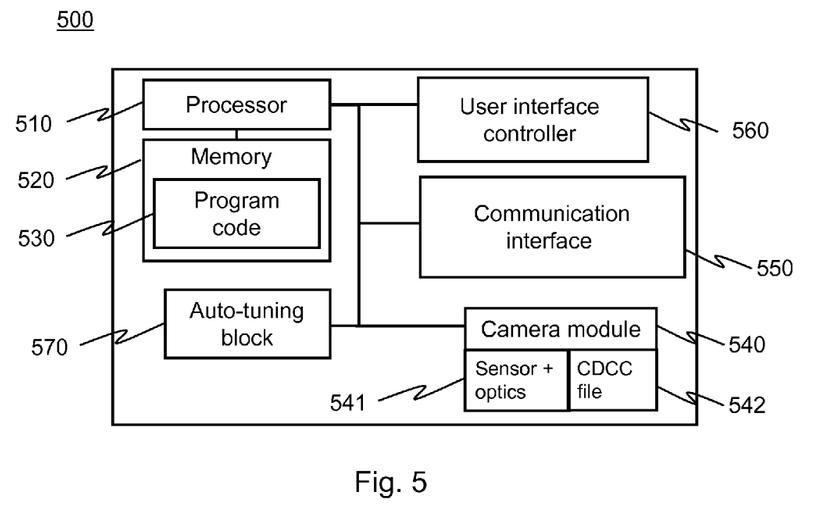
FIG. 5 shows an example block diagram of an apparatus in which various example embodiments of the invention may be applied.

FIG. 5 shows an example block diagram of an apparatus 500 in which various embodiments of the invention may be applied. This may be a user device or apparatus, such as an electronic device, a digital camera device, a personal digital assistant (PDA), a laptop computer, a mobile terminal or other communication device.

The general structure of the apparatus 500 comprises a communication interface module 550, a processor 510 coupled to the communication interface module 550, and a memory 520 coupled to the processor 510. The apparatus further comprises software 530 stored in the memory 520 and operable to be loaded into and executed in the processor 510. The software 530 may comprise one or more software modules and can be in the form of a computer program product. The apparatus 500 further comprises a user interface controller 560 coupled to the processor 510 and a camera module 540 comprising an image sensor 541, optics and mechanics (not shown). The camera module 540 may further comprise a common dynamic camera configuration (CDCC) file 542. The apparatus 500 may further comprise an auto-tuning block 570.

The communication interface module 550 implements at least part of radio transmission for various embodiments of the invention. The communication interface module 550 may be, e.g., a radio interface module, such as a WLAN, Bluetooth, GSM/GPRS, CDMA, WCDMA, or LTE (Long Term Evolution) radio module. The communication interface module 550 may be integrated into the apparatus 500 or into an adapter, card or the like that may be inserted into a suitable slot or port of the apparatus 500. The communication interface module 550 may support one radio interface technology or a plurality of technologies. FIG. 5 shows one communication interface module 550, but the apparatus 500 may comprise a plurality of communication interface modules 550.

The processor 510 may be, e.g., a central processing unit (CPU), a microprocessor, a digital signal processor (DSP), an image signal processor (ISP), a graphics processing unit, or the like. FIG. 5 shows one processor 510, but the apparatus 500 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 500 may comprise a plurality of memories. The memory 520 may be constructed as a part of the apparatus 500 or it may be inserted into a slot, port, or the like of the apparatus 500 by a user. The memory 520 may serve the sole purpose of storing data, or it may be constructed as a part of an apparatus serving other purposes, such as processing data.

The camera module 540 may comprise the digital camera with the image sensor 541 and the common dynamic camera configuration (CDCC) file 542. The common dynamic camera configuration (CDCC) file 542 may also be stored to the memory 520 of the apparatus 500. The digital camera with the image sensor 541 may also comprise only the image sensor. The camera module 540 may also be integrated as a modular component to the apparatus 500 or the camera module 540 may be attached to the apparatus 500 as an accessory and replaceable by a user.

The auto-tuning block 570 may comprise circuitry for receiving the image statistics from the camera module 540 and the camera module characterization parameters from the common dynamic camera configuration (CDCC) file 542. The auto-tuning block 570 may be a software component located in the host apparatus memory 530 and processed by the processor 510. The auto-tuning block 570 may also be implemented as a separate hardware block dedicated to a particular task.

The user interface controller 560 may comprise circuitry for receiving input from a user of the apparatus 500, e.g., via a keyboard, graphical user interface shown on the display of the apparatus 500, speech recognition circuitry, or an accessory device, such as a headset, and for providing output to the user via, e.g., a graphical user interface or a loudspeaker.

A skilled person appreciates that in addition to the elements shown in FIG. 5, the apparatus 500 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 500 may comprise a disposable or rechargeable battery (not shown) for powering the apparatus 500 when external power if external power supply is not available. Stretch ability for the battery may be achieved by packing electrolyte fluids in a stretchable housing.

Figure 6:
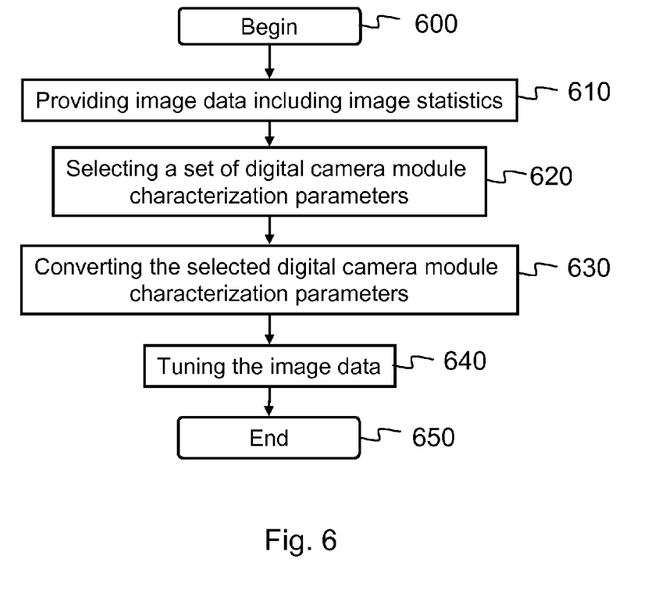
FIG. 6 shows a flow chart showing operations in an apparatus in accordance with an example embodiment of the invention.

FIG. 6 shows a flow diagram showing operations in an apparatus in accordance with an example embodiment of the invention. In step 600, the operation is started. In step 610, image data including image statistics is provided using a digital camera module. In step 620, a set of digital camera module characterization parameters is selected from the common dynamic camera configuration file using the image statistics. The selected digital camera module characterization parameters are converted to image signal processing parameters in step 630. The image data is tuned using the image signal processing parameters for providing a tuned image in step 640. In step 650, the operation is ended.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
a digital camera module configured to provide image data including image statistics;
an auto-tuning block configured to convert digital camera module characterization parameters;
at least one processor and at least one memory including computer program code, the at least one memory and the computer program code configured to, with the at least one processor, cause the apparatus at least to:
select a set of digital camera module characterization parameters from a common dynamic camera configuration file using the image statistics, wherein the common dynamic camera configuration file is specific for the digital camera module;
convert, by the auto-tuning block, the selected digital camera module characterization parameters to image signal processing parameters; and
tune the image data using the image signal processing parameters to provide a tuned image.

2. The apparatus of claim 1, wherein the image data is in raw image format.

3. The apparatus of claim 1, wherein the image statistics comprise at least one of the following: exposure time, analog gain, aperture, focal distance, white balance gain, correlated color temperature estimate and auto exposure.

4. The apparatus of claim 1, wherein the digital camera module characterization parameters comprise at least one of the following: black level, image sensor saturation limit, lens shading correction, noise filtering and sharpening.

5. The apparatus of claim 1, wherein the common dynamic camera configuration file can be updated independently from the at least one processor.

6. The apparatus of claim 1, wherein the common dynamic camera configuration file is divided into at least two parameter sets with unique identification and version number.

7. The apparatus of claim 6, wherein the identification is configured to link content of a parameter set to logical image signal processing.

8. The apparatus of claim 1, wherein the common dynamic camera configuration file is stored in the at least one memory of the apparatus.

9. The apparatus of claim 1, wherein the common dynamic camera configuration file is stored in the digital camera module.

10. The apparatus of claim 1, wherein the common dynamic camera configuration file is configured to be usable by at least two different processor types.

11. The apparatus of claim 1, further comprising:
a second digital camera module configured to provide second image data including second image statistics; and
the at least one memory and the computer program code configured to, with the at least one processor, cause the apparatus at least to:
select a set of second digital camera module characterization parameters from a second common dynamic camera configuration file using the second image statistics;
convert, by the auto-tuning block, the selected set of second digital camera module characterization parameters to second image signal processing parameters; and
tune the second image data using the second image signal processing parameters for providing a second tuned image.

12. A method comprising:
providing image data including image statistics using a digital camera module;
selecting a set of digital camera module characterization parameters from the common dynamic camera configuration file using the image statistics, wherein the common dynamic camera configuration file is specific for the digital camera module;
converting, by the auto-tuning block, the selected digital camera module characterization parameters to image signal processing parameters; and
tuning the image data using the image signal processing parameters for providing a tuned image.

13. The method of claim 12, wherein the image statistics comprise at least one of the following: exposure time, analog gain, aperture, focal distance, auto white balance gain, correlated color temperature estimate auto focus and auto exposure.

14. The method of claim 12, wherein the camera module characterization parameters comprise at least one of the following: black level, image sensor saturation limit, lens shading correction, noise filtering and sharpening.

15. The method of claim 12, further comprising:
updating the common dynamic camera configuration independently from the at least one processor.

16. The method of claim 12, further comprising: dividing the common dynamic camera configuration file into at least two parameter sets with unique identification and version number.

17. The method of claim 16, further comprising:
linking content of a parameter set to logical image signal processing using the identification.

18. The method of claim 12, further comprising:
providing second image data including second image statistics using a second digital camera module;
selecting a second set of digital camera module characterization parameters from the second common dynamic camera configuration file using the second image statistics;
converting, by the auto-tuning block, the second selected digital camera module characterization parameters to second image signal processing parameters;
tuning the second image data using the second image signal processing parameters for providing a second tuned image.

19. A computer program stored on a non-transitory computer readable medium, the computer program comprising computer executable program code configured to cause an apparatus, when executing the program code, to perform the method of claim 12.

* * * * *